United States Patent
Sekine et al.

(10) Patent No.: US 10,472,503 B2
(45) Date of Patent: Nov. 12, 2019

(54) RUBBER COMPOSITION AND PNEUMATIC TIRE USING SAME

(71) Applicant: The Yokohama Rubber Co., LTD., Minato-ku, Tokyo (JP)

(72) Inventors: Yuko Sekine, Hiratsuka (JP); Makoto Ashiura, Hiratsuka (JP); Ryosuke Sakai, Hiratsuka (JP); Fumito Yatsuyanagi, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/580,668

(22) PCT Filed: Jun. 10, 2016

(86) PCT No.: PCT/JP2016/067427
§ 371 (c)(1),
(2) Date: Dec. 7, 2017

(87) PCT Pub. No.: WO2016/199914
PCT Pub. Date: Dec. 15, 2016

(65) Prior Publication Data
US 2018/0186975 A1    Jul. 5, 2018

(30) Foreign Application Priority Data
Jun. 12, 2015    (JP) .................................. 2015-119774

(51) Int. Cl.
*C08L 9/06*       (2006.01)
*B60C 1/00*       (2006.01)
(Continued)

(52) U.S. Cl.
CPC ...... *C08L 9/06* (2013.01); *B60C 1/00* (2013.01); *B60C 1/0016* (2013.01); *C08K 3/04* (2013.01);
(Continued)

(58) Field of Classification Search
CPC .. C08L 21/00; C08L 25/10; C08L 9/06; C08L 2205/025; C08K 3/04; C08K 3/36; B60C 1/00; B60C 1/0016
(Continued)

(56) References Cited

U.S. PATENT DOCUMENTS 6,362,272 B1 *   3/2002   Tadaki ................. B60C 1/0016
                                                                524/493
2011/0301280 A1    12/2011  Kushida

FOREIGN PATENT DOCUMENTS

JP    S57-179212    11/1982
JP    H03-239737    10/1991
(Continued)

OTHER PUBLICATIONS

International Search Report for International Application No. PCT/JP2016/067427 dated Jul. 26, 2016, 4 pages, Japan.
(Continued)

*Primary Examiner* — Angela C Scott
(74) *Attorney, Agent, or Firm* — Thorpe North & Western

(57) ABSTRACT

The present technology provides a rubber composition containing a diene rubber including a styrene-butadiene copolymer component including at least one type of styrene-butadiene copolymer and a reinforcing filler. The bonded styrene content is from 5 to 50 wt. %. The total amount of styrene of an ozone decomposed component S1 including one styrene-derived unit and an ozone decomposed component S1V1 including one styrene-derived unit and one 1,2-bonded butadiene-derived unit is less than 80 wt. % of the amount of bonded styrene. The total amount of styrene of the decomposed component S1V1 is less than 10 wt. % of the amount of bonded styrene. The integrated intensity of an ozone decomposed component S1V2 including one styrene-derived unit and two 1,2-bonded butadiene-derived units is less than 15% of the integrated intensity of all
(Continued)

decomposed components including styrene-derived units. The vinyl content of a butadiene portion is not less than 50%.

8 Claims, 1 Drawing Sheet

(51) Int. Cl.
    *C08K 3/04* (2006.01)
    *C08K 3/36* (2006.01)
    *C08L 21/00* (2006.01)
    *C08L 25/10* (2006.01)
    *C08L 9/00* (2006.01)
    *C08L 7/00* (2006.01)

(52) U.S. Cl.
    CPC .................. *C08K 3/36* (2013.01); *C08L 7/00* (2013.01); *C08L 9/00* (2013.01); *C08L 21/00* (2013.01); *C08L 25/10* (2013.01); *C08L 2205/025* (2013.01)

(58) Field of Classification Search
    USPC ........................................................ 524/526
    See application file for complete search history.

(56) References Cited

FOREIGN PATENT DOCUMENTS

| | | |
|---|---|---|
| JP | 2000-038423 | 2/2000 |
| JP | 2000-178378 | 6/2000 |
| JP | 2011-252124 | 12/2011 |
| JP | 2013-185092 | 9/2013 |

OTHER PUBLICATIONS

Yasuyuki Tanaka et al., Determination of Sequence Length Distribution in SBR by Ozonolysis—g.p.c. Method, Article, Jan. 23, 1981, vol. 22, pp. 1721-1723, Japan.

Yasuyuki Tanaka et al., Macromolecules, Feb. 28, 1983, Article, vol. 16, pp. 1925-1928, Japan.

* cited by examiner

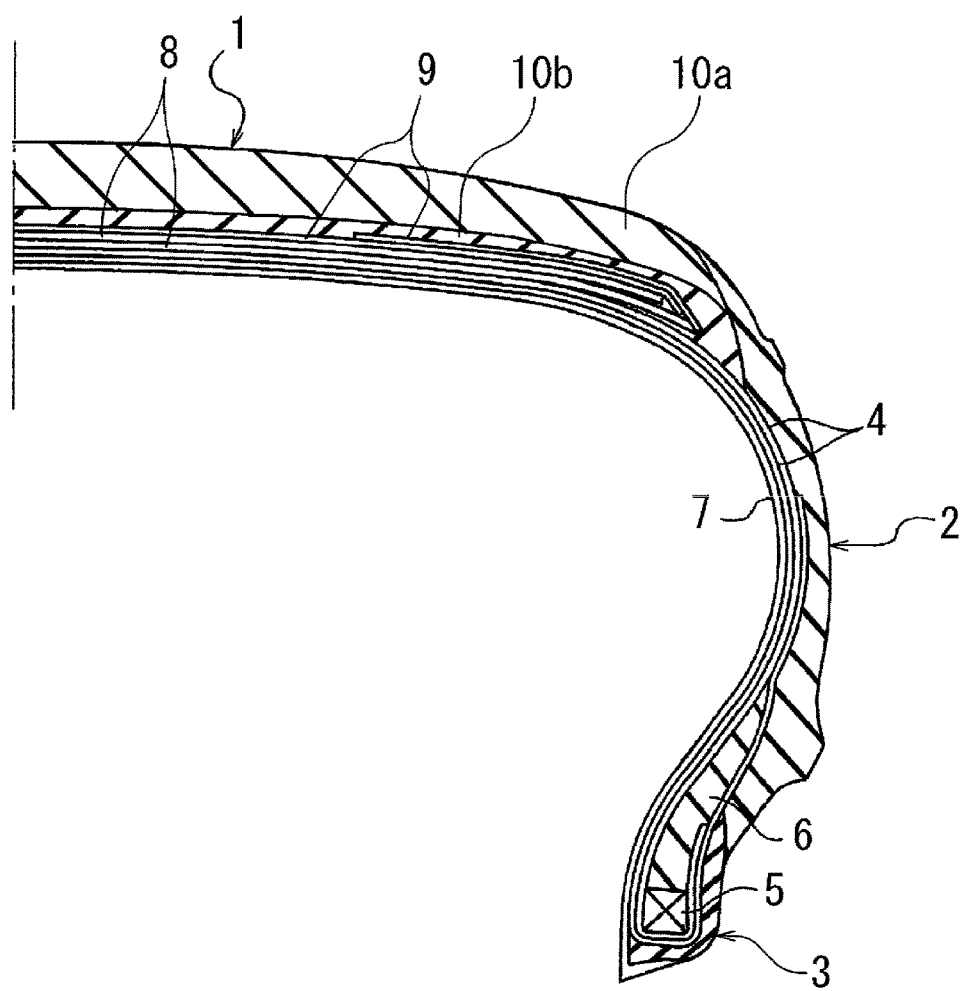

RUBBER COMPOSITION AND PNEUMATIC TIRE USING SAME

TECHNICAL FIELD

The present technology relates to a rubber composition configured so as to enhance wear resistance, tensile strength at break, and tensile elongation at break to or beyond conventional levels, and a pneumatic tire using the same.

BACKGROUND ART

In recent years, there has been a demand for high wet grip performance and low rolling resistance in pneumatic tires. In order to satisfy these demands, there is a known technique of compounding a reinforcing filler such as a styrene-butadiene copolymer or silica with a rubber composition constituting a cap tread of a tire. In order to further enhance the wear resistance or rubber hardness of the rubber composition, it has been proposed to compound polybutadiene or a silica having high reactivity, for example, but in this case, there has been a problem in that the rubber strength decreases or the processability is diminished.

Japanese Unexamined Patent Application Publication No. 03-239737 describes that a pneumatic tire using a rubber composition prepared by compounding a silica and a styrene-butadiene copolymer having a specific arrangement of styrene-derived units for a tread simultaneously achieves wet skid resistance, rolling resistance, and wear resistance. However, this rubber composition has not necessarily been capable of sufficiently satisfying the demands of consumers due to a decrease in rubber strength.

Japanese Unexamined Patent Application Publication No. 57-179212 describes a styrene-butadiene copolymer in which, a long-chain styrene block content is not greater than 5 wt. %, a simple chain content having one styrene-derived unit is not less than 50 wt. % relative to the total styrene content in the styrene-butadiene copolymer, and a total styrene content is from 10 to 30 wt. % of the styrene-butadiene copolymer content. However, the styrene-butadiene copolymer of Japanese Unexamined Patent Application Publication No. 57-179212 was not sufficient to enhance the tensile strength at break, wear resistance, and low hysteresis loss of the rubber composition.

SUMMARY

The present technology provides a rubber composition by which wear resistance, tensile strength at break, and tensile elongation at break are achieved and enhanced to or beyond conventional levels.

The rubber composition of the present technology which achieves the object described above is a rubber composition including a diene rubber containing at least one type of styrene-butadiene copolymer and a reinforcing filler, the styrene-butadiene copolymer component including the at least one type of styrene-butadiene copolymer having the characteristics of (1) to (4) below:

(1) a bonded styrene content is from 5 to 50 wt. %;

(2) when a decomposed component S1 including one styrene-derived unit and a decomposed component S1V1 including one styrene-derived unit and one 1,2-bonded butadiene-derived unit are measured by gel permeation chromatography as decomposed components obtained by ozone decomposition, a total amount of styrene of the decomposed component S1 and the decomposed component S1V1 is less than 80 wt. % of the amount of bonded styrene, and a total amount of styrene of the decomposed component S1V1 is less than 10 wt. % of the amount of bonded styrene;

(3) when the decomposed components obtained by ozone decomposition are measured by liquid chromatography-mass spectrometer, an integrated intensity of a decomposed component S1V2 including one styrene-derived unit and two 1,2-bonded butadiene-derived units is less than 15% of an integrated intensity of all decomposed components including styrene-derived units; and (4) a vinyl content of a butadiene portion is not less than 50%.

In accordance with the configuration described above, the rubber composition of the present technology includes a diene rubber containing a styrene-butadiene copolymer component and a reinforcing filler, the styrene-butadiene copolymer component satisfying the following characteristics: (1) the bonded styrene content is from 5 to 50 wt. %; (2) the total amount of styrene of an ozone decomposed component S1 including one styrene-derived unit and an ozone decomposed component S1V1 including one styrene-derived unit and one 1,2-bonded butadiene-derived unit is less than 80 wt. % of the amount of bonded styrene, and the total amount of styrene of the decomposed component S1V1 is less than 10 wt. % of the amount of bonded styrene; (3) the integrated intensity of an ozone decomposed component S1V2 including one styrene-derived unit and two 1,2-bonded butadiene-derived units is less than 15% of the integrated intensity of all decomposed components including styrene-derived units; and (4) the vinyl content of a butadiene portion is not less than 50%. Therefore, it is possible to achieve and enhance wear resistance, tensile strength at break, and tensile elongation at break to or beyond conventional levels.

The diene rubber may contain at least one type selected from natural rubber, polyisoprene, and polybutadiene. The reinforcing filler may be at least one type selected from silica and carbon black.

The rubber composition described above is suitable for use in a pneumatic tire and is particularly preferably used in a cap tread. This pneumatic tire enhances wear resistance and has excellent tensile strength at break, and thus, the tire can enhance grip performance to or beyond conventional levels.

BRIEF DESCRIPTION OF DRAWING

FIG. 1 is a partial cross-sectional view in a tire meridian direction that illustrates an example of an embodiment of a pneumatic tire in which a rubber composition of the present technology is used.

DETAILED DESCRIPTION

FIG. 1 is a cross-sectional view that illustrates an example of an embodiment of a pneumatic tire in which a rubber composition is used. The pneumatic tire includes a tread portion 1, a sidewall portion 2, and a bead portion 3.

In FIG. 1, two carcass layers 4, formed by arranging reinforcing cords extending in a tire circumferential direction at a predetermined pitch and embedding these reinforcing cords in a rubber layer, are disposed extending between left and right bead parts 3. Both ends of the carcass layers 4 are made to sandwich a bead filler 6 and are folded back around a bead core 5 that is embedded in the bead parts 3 in a tire axial direction from the inside to the outside. An innerliner layer 7 is disposed inward of the carcass layers 4. Two layers of a belt layer 8, formed by arranging reinforcing cords extending inclined to the tire circumferential direction in the tire axial direction at a predetermined pitch and embedding these reinforcing cords in a rubber layer, is disposed on an outer circumferential side of the carcass layers 4 of the tread portion 1. The reinforcing cords of the two layers of a belt layer 8 are inclined with respect to the tire circumferential direction, and the direction of the cords of the different layers have an opposite orientation and cross each other. A belt cover layer 9 is disposed outward of the belt layers 8. The tread portion 1 is formed from tread rubber layers 10a and 10b on the outer circumferential side of the belt cover layer 9. The tread rubber layers 10a and 10b are a cap tread and a base tread and are preferably made of the rubber composition of the present technology.

The rubber composition of the present technology contains a diene rubber and a reinforcing filler. The diene rubber includes at least one type of styrene-butadiene copolymer. In the present specification, a polymer component made of at least one type of styrene-butadiene copolymer may be called a "styrene-butadiene copolymer component". In the present technology, the styrene-butadiene copolymer component satisfies all of the characteristics of (1) to (4) below:

(1) the bonded styrene content is from 5 to 50 wt. %;

(2) when a decomposed component S1 including one styrene-derived unit and a decomposed component S1V1 including one styrene-derived unit and one 1,2-bonded butadiene-derived unit are measured by gel permeation chromatography (GPC) as decomposed components obtained by ozone decomposition, the total amount of styrene of the decomposed component S1 and the decomposed component S1V1 is less than 80 wt. % of the amount of bonded styrene, and the total amount of styrene of the decomposed component S1V1 is less than 10 wt. % of the amount of bonded styrene;

(3) when the decomposed components obtained by ozone decomposition are measured by liquid chromatography-mass spectrometer (LCMS), the integrated intensity of a decomposed component S1V2 including one styrene-derived unit and two 1,2-bonded butadiene-derived units is less than 15% of the integrated intensity of all decomposed components including styrene-derived units; and (4) the vinyl content of a butadiene portion is not less than 50%.

When the styrene-butadiene copolymer component includes a single styrene-butadiene copolymer, the single styrene-butadiene copolymer needs to satisfy all of the characteristics of (1) to (4) described above.

In addition, when the styrene-butadiene copolymer component includes a blend of a plurality of styrene-butadiene copolymers, the styrene-butadiene copolymer component needs to satisfy all of the characteristics of (1) to (4) described above as a whole. As long as the styrene-butadiene copolymer component satisfies the characteristics of (1) to (4) as a whole, each styrene-butadiene copolymer constituting the blend may or may not satisfy all of the characteristics of (1) to (4) described above. Each of the styrene-butadiene copolymers constituting the blend preferably satisfy all of the characteristics of (1) to (4). By forming the styrene-butadiene copolymer component with two or more types of styrene-butadiene copolymers which satisfy all of the characteristics of (1) to (4), it is possible to form a rubber composition having superior wear resistance, tensile strength at break, and tensile elongation at break.

In the present technology, the styrene-butadiene copolymer satisfies (1): the bonded styrene content is from 5 to 50 wt. % and preferably from 10 to 40 wt. %. By setting the styrene content of the styrene-butadiene copolymer to within such a range, it is possible to enhance the balance between the wet skid characteristics and the wear resistance and tensile strength at break of the rubber composition. This makes it possible to obtain a rubber composition which solves the problem of the present technology. When the styrene content of the styrene-butadiene copolymer is less than 5 wt. %, the wet skid characteristics, wear resistance, and tensile strength at break are diminished. When the styrene content of the styrene-butadiene copolymer exceeds 50 wt. %, the glass transition temperature (Tg) of the styrene-butadiene copolymer rises, the balance of viscoelastic characteristics is diminished, and the effect of reducing heat build-up becomes difficult to achieve. That is, the balance between hysteresis loss and wet skid characteristics is diminished. Note that the styrene content of the styrene-butadiene copolymer is measured by $^1$H-NMR.

The styrene-butadiene copolymer used in the present technology satisfies (2): an ozone decomposed component S1 including one styrene-derived unit and an ozone decomposed component S1V1 including one styrene-derived unit and one 1,2-bonded butadiene-derived unit are measured by gel permeation chromatography (GPC) as decomposed components obtained by ozone decomposition. At this time, the total amount of styrene of the ozone decomposed component S1 and the ozone decomposed component S1V1 is less than 80 wt. % of the amount of bonded styrene, and the total amount of styrene of the ozone decomposed component S1V1 is less than 10 wt. % of the amount of bonded styrene.

The styrene-butadiene copolymer is a copolymer of styrene and butadiene and includes repeating units of styrene (styrene units) and repeating units of butadiene (butadiene units). The butadiene units include a portion in which butadiene is polymerized by 1,2-bonds (repeating units of ethylene having a vinyl group in a side chain) and a portion in which butadiene is polymerized by 1,4-bonds (repeating units of divalent groups of 2-butylene). In addition, the portion polymerized by 1,4-bonds includes repeating units with a trans-2-butylene structure and repeating units with a cis-2-butylene structure.

When the styrene-butadiene copolymer is subjected to ozone decomposition, the portion polymerized by 1,4-bonds is cleaved. In addition, the vinyl group of the side chain is oxidized to form a hydroxymethyl group. As a result, the repeating units sandwiched between two adjacent butadiene units polymerized by 1,4-bonds in the styrene-butadiene copolymer are produced as ozone decomposed components. For example, when a portion in which only one styrene unit in the main chain is sandwiched between two butadiene units polymerized by 1,4-bonds is subjected to ozone decomposition, a compound represented by the general formula (I) below is produced. In the present specification, the compound represented by the general formula (I) is called "ozone decomposed component S1".

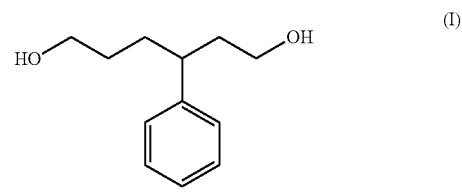

(I)

In addition, when a portion in which one styrene unit in the main chain and one butadiene unit polymerized by a 1,2-bond are sandwiched by adjacent butadiene units polymerized by 1,4-bonds is subjected to ozone decomposition, compounds represented by the general formulas (II) and (III) below are produced. In the present specification, the compounds represented by the general formulas (II) and (III) are called "ozone decomposed components S1V1".

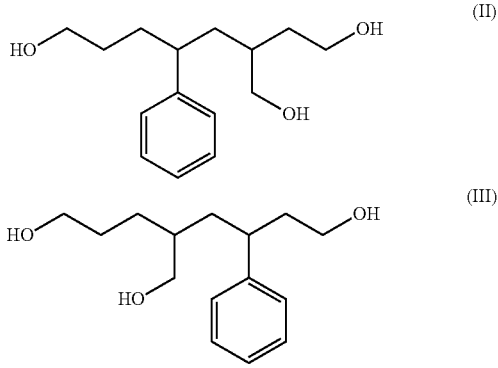

Further, when a portion in which one styrene unit in the main chain and two butadiene units polymerized by 1,2-bonds are sandwiched by adjacent butadiene units polymerized by 1,4-bonds is subjected to ozone decomposition, compounds represented by the general formulas (IV) to (VI) below are produced. In the present specification, the compounds represented by the general formulas (IV) to (VI) are called "ozone decomposed components S1V2".

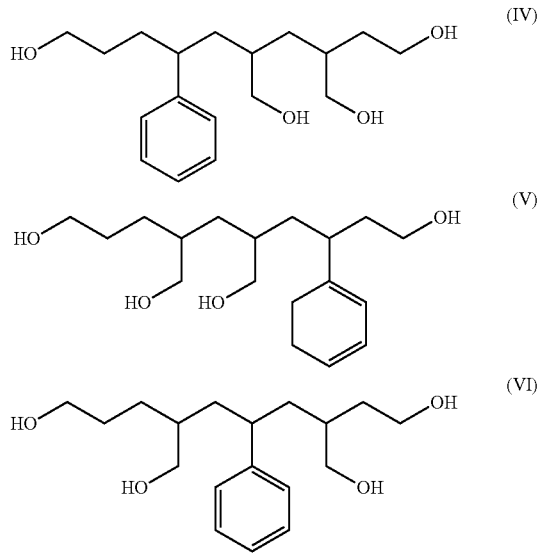

The portion sandwiched between two adjacent butadiene units polymerized by 1,4-bonds as described above is produced as a decomposed component in which a styrene-derived unit and/or a 1,2-bonded butadiene-derived unit are sandwiched by hydroxyethyl groups at both terminals. In addition, 1,4-butanediol is produced from repeating portions having two or more consecutive butadiene units polymerized by 1,4-bonds.

When the decomposed components obtained by ozone decomposition are measured by gel permeation chromatography (GPC) in the styrene-butadiene copolymer used in the present technology, the total amount of styrene of the ozone decomposed component S1 and the ozone decomposed component S1V1 is less than 80 wt. %, preferably less than 70 wt. %, more preferably from 20 to 50 wt. %, and even more preferably from 35 to 65 wt. % of the amount of bonded styrene. Here, decomposed components including one styrene-derived unit refer to the ozone decomposed component S1 including only one styrene-derived unit and the ozone decomposed component S1V1 including one styrene-derived unit and one 1,2-bonded butadiene-derived unit as described above. The number of moles of the styrene-derived units in each decomposed component is determined by measuring the ozone decomposed components by gel permeation chromatography (GPC). The weight of styrene in each ozone decomposed component is calculated on the basis of this number of moles of styrene-derived units. The total amount of styrene of the ozone decomposed components S1 and S1V1 determined in this manner needs to be less than 80 wt. % of the amount of bonded styrene. This makes it possible to obtain a composition exhibiting superior wear resistance and tensile strength at break.

In addition to the above description, when the decomposed components obtained by ozone decomposition are measured by gel permeation chromatography (GPC) in the styrene-butadiene copolymer used in the present technology, the total amount of styrene of the ozone decomposed component S1V1 including one styrene-derived unit and one 1,2-bonded butadiene-derived unit is less than 10 wt. % and preferably not less than 3 wt. % and less than 10 wt. % of the amount of bonded styrene. Here, the ozone decomposed component S1V1 is an ozone decomposed component including one styrene-derived unit and one 1,2-bonded butadiene-derived unit as described above, and corresponds to the decomposed components represented by the general formulas (II) and (III) above. The number of moles of the decomposed components represented by the general formulas (II) and (III) is determined by measuring the ozone decomposed components by gel permeation chromatography (GPC), and the weight of styrene is calculated on the basis of this number. The amount of styrene in the ozone decomposed component including one styrene-derived unit and one 1,2-bonded butadiene-derived unit needs to be less than 10 wt. % of the amount of bonded styrene. This makes it possible to obtain a composition exhibiting excellent wear resistance and tensile strength at break. In addition, the tensile elongation at break can be maintained and enhanced.

In the present specification, the method for subjecting the styrene-butadiene copolymer to ozone decomposition and the measurement of ozone decomposed products are performed in accordance with the methods described by Tanaka, et al., Polymer, 22, 1721 (1981) and Macromolecules, 16, 1925 (1983). Note that in the analysis method described by Tanaka, et al., the total of general formulas (I), (II), and (III) described above is called a "styrene simple chain". In contrast, as described above, in the present technology, attention is focused on the total amount of the ozone decomposed component S1 including only one styrene-derived unit and the ozone decomposed component S1V1 including one styrene-derived unit and one 1,2-bonded butadiene-derived unit (S1+S1V1; total decomposed components represented by the general formulas (I), (II), and (III) above) and the decomposed component including one styrene-derived unit and one 1,2-bonded butadiene-derived unit (S1V1; decomposed components represented by the general formulas (II) and (III) above), and the analyses thereof are performed separately.

In the present specification, the conditions for measuring the ozone decomposed components by gel permeation chromatography (GPC) may be as follows.

Measurement instrument: LC-9104 (manufactured by Japan Analytical Industry Co., Ltd.)

Columns: two of each of JAIGEL-1H and JAIGEL-2H (both manufactured by Japan Analytical Industry Co., Ltd.) connected in series Detectors: UV Detector 3702 (manufactured by Japan Analytical Industry Co., Ltd.)

Differential refractometer RI Detector RI-7 (manufactured by Japan Analytical Industry Co., Ltd.)

Eluent: chloroform

Column temperature: room temperature

The styrene-butadiene copolymer used in the present technology satisfies (3): when the decomposed components obtained by ozone decomposition are measured by liquid chromatography-mass spectrometer (LCMS), an integrated intensity of a decomposed component S1V2 including one styrene-derived unit and two 1,2-bonded butadiene-derived units is less than 15% and preferably not less than 3% and less than 15% of an integrated intensity of all decomposed components including styrene-derived units. By setting the integrated intensity of the decomposed component S1V2 to less than 15%, it is possible to enhance the tensile strength at break and the tensile elongation at break. In particular, by setting the total amount of styrene in the decomposed component S1V1 described above to less than 10 wt. % of the amount of bonded styrene and setting the integrated intensity of the decomposed component S1V2 to less than 15%, it is possible to obtain a composition exhibiting superior tensile strength at break and tensile elongation at break. Here, the ozone decomposed component S1V2 including one styrene-derived unit and two 1,2-bonded butadiene-derived units is an ozone decomposed component including one styrene-derived unit and two 1,2-bonded butadiene-derived units as described above, and corresponds to the decomposed components represented by the general formulas (IV), (V), and (VI) above. By measuring these by liquid chromatography-mass spectrometer (LCMS), the integrated intensities of peaks unique to decomposed components having the molecular weights of general formulas (IV), (V), and (VI) are determined.

The integrated intensity of each decomposed component can be determined using the following measurement method and analysis method. Since the molecules of each decomposed component can be detected in the state of a sodium adduct ion, each mass chromatogram can be extracted on the basis of the mass spectrum thereof. In the case of the decomposed component S1V2 including one styrene-derived unit and two 1,2-bonded butadiene-derived units, the mass spectrum of a sodium adduct ion is 333.21. In the mass chromatogram of 333.21, the peak of the decomposed component S1V2 is confirmed, and the integrated intensity A[S1V2] is determined. Similarly, the integrated intensities of all other decomposed components including styrene-derived units are determined, and the sum A[total] is determined. The ratio of the integrated intensity A[S1V2] of the ozone decomposed component S1V2 including one styrene-derived unit and two 1,2-bonded butadiene-derived units to the sum A[total] of the integrated intensities of all decomposed components including styrene-derived units is calculated from the formula A[S1V2]/A[total]×100.

In the present specification, the conditions for measuring the ozone decomposed components by liquid chromatography-mass spectrometer (LCMS) may be as follows.

Liquid chromatograph: Alliance 2695 (manufactured by Waters)

Mass spectrometer: ZQ2000 (manufactured by Waters)

Column: Hydrosphere C18 (manufactured by YMC, inner diameter: 2.0 mm, length: 150 mm, particle size: 3 μm)

Injection rate: 5 μL (approximately 10 mg/mL)

Mobile phase A: water

Mobile phase B: methanol

Flow rate: 0.2 mL/min

Time program: B conc. 20% (0 min)→100% (35 min)→100% (50 min)

Ion source temperature: 120° C.

Desolvent temperature: 350° C.

Cone voltage: 40 V

Ionization method: (ESI positive mode)

Mass spectrometry conditions: Scan measurement, mass range: m/z 50-2000

The styrene-butadiene copolymer component used in the present technology satisfies (4): the vinyl content of the butadiene portion is not less than 50% and preferably from 50 to 65%. By setting the vinyl content of the butadiene portion in the styrene-butadiene copolymer component to not less than 50%, it is possible to enhance the balance between the hysteresis loss and wet skid characteristics of the rubber composition. That is, by setting the vinyl content of the butadiene portion to not less than 50%, it is possible to maintain and enhance the tensile strength at break and the wear resistance and to suppress increases in the hysteresis loss. Note that the vinyl content of the butadiene portion is measured by $^1$H-NMR.

The content of the styrene butadiene copolymer component having the characteristics of (1) to (4) is preferably not less than 40 wt. %, more preferably from 60 to 100 wt. %, and even more preferably from 80 to 100 wt. % out of 100 wt. % of the diene rubber. By setting the content of the styrene-butadiene copolymer component specified by characteristics (1) to (4) to not less than 40 wt. %, it is possible to obtain a rubber composition having excellent wear resistance, tensile strength at break, and tensile elongation at break.

The styrene-butadiene copolymer component specified by characteristics (1) to (4) can be prepared by using a single styrene-butadiene copolymer or by combining a plurality of styrene-butadiene copolymers. In general, the chain structure of a styrene-butadiene copolymer synthesized by a solution polymerization method can be controlled, and the characteristics (1) to (4) can be easily adjusted by the polymerization temperature at the time of synthesis, the timing of introducing monomers, the types and amounts of randomizers, and the like. In addition, when an existing styrene-butadiene copolymer is blended, the styrene-butadiene copolymer component having characteristics (1) to (4) can be prepared by combining a plurality of solution-polymerized styrene-butadiene copolymers having controllable chain structures and combining an emulsion-polymerized styrene-butadiene copolymer primarily having a random structure and one or more solution-polymerized styrene-butadiene copolymers.

The rubber composition of the present technology may include other diene rubbers in addition to a styrene-butadiene copolymer component satisfying all of the characteristics (1) to (4). Examples of other diene rubbers include natural rubber (NR), polyisoprene rubber (IR), polybutadiene rubber (low-cis BR), high-cis BR, high-trans BR (trans-bond content of the butadiene portion: 70 to 95%), styrene-isoprene copolymer rubber, butadiene-isoprene copolymer rubber, solution-polymerized random styrene-butadiene-isoprene copolymer rubber, emulsion-polymerized random styrene-butadiene-isoprene copolymer rubber, emulsion-polymerized styrene-acrylonitrile-butadiene copolymer rubber, acrylonitrile-butadiene copolymer rubber, high-vinyl SBR/low-vinyl SBR block copolymer rubber, polyisoprene-SBR block copolymer rubber, and polystyrene-polybutadiene-polystyrene block copolymers.

The content of the other diene rubber is preferably not greater than 60 wt. %, more preferably from 0 to 40 wt. %, and even more preferably from 0 to 20 wt. % out of 100 wt. % of the diene rubber. Containing another diene rubber makes it possible to enhance various physical properties such as the wear resistance, tensile strength at break, and tensile elongation at break.

The rubber composition of the present technology contains a diene rubber and a reinforcing filler. Examples of reinforcing fillers include inorganic fillers such as carbon black, silica, clay, aluminum hydroxide, calcium carbonate, mica, talc, aluminum hydroxide, aluminum oxide, titanium oxide, and barium sulfate and organic fillers such as cellulose, lecithin, lignin, and dendrimer. Of these, it is preferable to compound at least one type selected from carbon black and silica.

By compounding carbon black into the rubber composition, it is possible to obtain a rubber composition exhibiting excellent wear resistance, tensile strength at break, and tensile elongation at break. The compounded amount of the carbon black is not particularly limited but is preferably from 10 to 100 parts by weight and more preferably from 25 to 80 parts by weight per 100 parts by weight of the diene rubber.

Carbon black such as furnace black, acetylene black, thermal black, channel black, and graphite may be compounded. Of these, furnace black is preferable, and specific examples thereof include SAF, ISAF, ISAF-HS, ISAF-LS, IISAF-HS, HAF, HAF-HS, HAF-LS, and FEF. These carbon blacks may each be used alone, or two or more types may be used in combination. In addition, a surface-treated carbon black obtained by chemically modifying these carbon blacks with various acid compounds or the like may also be used.

In addition, compounding silica with the rubber composition makes it possible to obtain a rubber composition exhibiting excellent low heat build-up and wet grip performance. The compounded amount of the silica is not particularly limited but is preferably from 10 to 150 parts by weight and more preferably from 40 to 100 parts by weight per 100 parts by weight of the diene rubber.

Any silica that is ordinarily used in rubber compositions for a tire tread such as wet silica, dry silica, carbon-silica in which silica is supported on a carbon black surface (dual-phase filler), or silica surface-treated with a compound which is reactive or compatible with both silica and rubber such as a silane coupling agent or polysiloxane. Of these, a wet silica containing hydrous silicic acid as a main component is preferable.

In the present technology, the compounded amount of the reinforcing filler including silica and/or carbon black is preferably from 10 to 150 parts by weight and more preferably from 40 to 100 parts by weight per 100 parts by weight of the diene rubber. When the compounded amount of the reinforcing filler is less than 10 parts by weight, the reinforcing performance cannot be sufficiently obtained, and the rubber hardness and tensile strength at break become insufficient. When the compounded amount of the reinforcing filler exceeds 150 parts by weight, the heat build-up of the rubber composition increases while the tensile elongation at break decreases. Moreover, the wear resistance and processability are also diminished.

A silane coupling agent is preferably compounded with the rubber composition of the present technology together with silica in that the low heat build-up and wear resistance are further enhanced. By compounding a silane coupling agent together with silica, the dispersibility of the silica is enhanced, and the reinforcing action with the diene rubber is further increased. The compounded amount of the silane coupling agent is preferably from 2 to 20 wt. % and more preferably from 5 to 15 wt. % of the compounded amount of the silica. When the compounded amount of the silane coupling agent is less than 2 wt. % of the weight of the silica, the effect of improving the dispersibility of the silica cannot be sufficiently obtained. Additionally, when the compounded amount of the silane coupling agent exceeds 20 wt. %, the diene rubber component tends to be easily gelified, so the desired effects cannot be achieved.

The silane coupling agent is not particularly limited, but a sulfur-containing silane coupling agent is preferable, and examples thereof include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, mercaptosilane compounds and the like described in JP-2006-249069 A such as 3-mercaptopropyltrimethoxysilane, 3-mercaptopropyldimethoxymethylsilane, 3-mercaptopropyldimethylmethoxysilane, 2-mercaptoethyltriethoxysilane, 3-mercaptopropyltriethoxysilane, and VP Si363 manufactured by Evonik, 3-trimethoxysilylpropyl-benzothiazole tetrasulfide, 3-triethoxysilylpropylbenzothiazolyl tetrasulfide, 3-triethoxysilylpropylmethacrylate monosulfide, 3-trimethoxysilylpropylmethacrylate monosulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, bis(3-diethoxymethylsilylpropyl)tetrasulfide, dimethoxymethylsilylpropyl-N,N-dimethylthiocarbamoyl tetrasulfide, dimethoxymethylsilylpropylbenzothiazolyl tetrasulfide, 3-octanoylthiopropyltriethoxysilane, 3-propionylthiopropyltrimethoxysilane, vinyl trimethoxysilane, vinyl triethoxysilane, vinyl tris(2-methoxyethoxy)silane, 3-glycidoxypropyltrimethoxysilane, 3-glycidoxypropylmethyldimethoxysilane, β-(3,4-epoxycyclohexyl)ethoxytrimethoxysilane, 3-aminopropyltrimethoxysilane, N-(β-aminoethyl)-γ-aminopropyltrimethoxysilane, and N-(β-aminoethyl)-γ-aminopropylmethyldimethoxysilane. In addition, the silane coupling agent may be an organosilicon compound, and examples of organosilicon compounds include polysiloxanes, silicon oils into which one or more organic groups such as an amino group, an epoxy group, a carbinol group, a mercapto group, a carboxyl group, a hydrogen group, a polyether group, a phenol group, a silanol group, an acrylic group, a methacrylic group, or a long-chain alkyl group are introduced into a side chain, both terminals, one terminal, or a side chain and both terminals of a polysiloxane, and silicon oligomers obtained by performing a condensation reaction on one or more type of organic silanes. Of these, bis-(3-triethoxysilylpropyl)tetrasulfide and bis(3-(triethoxysilyl)propyl) disulfide are preferable.

In addition to the components described above, the rubber composition of the present technology may also include various compounding agents that are commonly used in rubber compositions for a tire tread. Examples thereof include vulcanizing or cross-linking agents, vulcanization accelerators, anti-aging agents, processing aids, plasticizers, liquid polymers, thermosetting resins, thermoplastic resins, and the like. These compounding agents are kneaded by a common method to obtain a rubber composition that can be used for vulcanization or cross-linking. These compounding agents can be compounded in conventional general amounts so long as the object of the present technology is not hindered. The rubber composition for a tire tread can be prepared by mixing the above-mentioned components using a well-known rubber kneading machine such as a Banbury mixer, a kneader, or a roller.

The vulcanizing or cross-linking agent is not particularly limited, but examples thereof include sulfur such as powdered sulfur, precipitated sulfur, colloidal sulfur, insoluble sulfur, and highly dispersible sulfur; halogenated sulfur such as sulfur monochloride and sulfur dichloride; and organic peroxides such as dicumyl peroxide and di-tert-butyl peroxide. Of these, sulfur is preferable, and powdered sulfur is particularly preferable. These vulcanizing or cross-linking agents may each be used alone, or two or more types may be used in combination. The compounding ratio of the vulcanizing agent is ordinarily from 0.1 to 15 parts by weight, preferably from 0.3 to 10 parts by weight, and even more preferably from 0.5 to 5 parts by weight per 100 parts by weight of the diene rubber.

The vulcanization accelerator is not particularly limited, but examples thereof include sulfenamide-based vulcanization accelerators such as N-cyclohexyl-2-benzothiazylsulfenamide, Nt-butyl-2-benzothiazolsulfenamide, N-oxyethylene-2-benzothiazolsulfenamide, and N,N'-diisopropyl-2-benzothiazolsulfenamide; guanidine-based vulcanization accelerators such as diphenylguanidine, di-o-tolylguanidine, and o-tolylbiguanidine; thiourea-based vulcanization accelerators such as diethylthiourea; thiazole-based vulcanization accelerators such as 2-mercaptobenzothiazole, dibenzothiazyldi sulfide, and 2-mercaptobenzothiazole zinc salt; thiuram-based vulcanization accelerators such as tetramethylthiuram monosulfide and tetramethylthiuram disulfide; dithiocarbamic acid-based vulcanization accelerators such as sodium dimethyldithiocarbamate and zinc diethyldithiocarbamate; and xanthogenic acid-based vulcanization accelerators such as sodium isopropylxanthate, zinc isopropylxanthate, and zinc butylxanthate. Of these, it is particularly preferable to contain a sulfenamide-based vulcanization accelerator. These vulcanization accelerators may each be used alone, or two or more types may be used in combination. The compounded amount of the vulcanization accelerator is preferably from 0.1 to 15 parts by weight and more preferably from 0.5 to 5 parts by weight per 100 parts by weight of the diene rubber.

The anti-aging agent is not particularly limited, but examples thereof include amine-based anti-aging agents such as 2,2,4-trimethyl-1,2-dihydroquinoline polymers, p,p'-dioctyldiphenylamine, N,N'-diphenyl-p-phenylenediamine, and N-phenyl-N'-1,3-dimethylbutyl-p-phenylenediamine, and phenol-based anti-aging agents such as 2,6-di-t-butyl-4-methylphenol and 2,2'-methylenebis(4-methyl-6-t-butylphenol). These anti-aging agents may each be used alone, or two or more types may be used in combination. The compounded amount of the anti-aging agent is preferably from 0.1 to 15 parts by weight and more preferably from 0.5 to 5 parts by weight per 100 parts by weight of the diene rubber.

The processing aid is not particularly limited, but examples thereof include higher fatty acids such as stearic acid, higher fatty acid amides such as stearic acid amide, aliphatic higher amines such as stearyl amine, aliphatic higher alcohols such as stearyl alcohol, partial esters of fatty acids and polyhydric alcohols such as glycerin fatty acid esters, fatty acid metal salts such as zinc stearate, and zinc oxide. The compounded amount is selected appropriately, but the compounded amounts of higher fatty acids, aliphatic higher amides, higher alcohols, and fatty acid metal salts are preferably from 0.05 to 15 parts by weight and more preferably from 0.5 to 5 parts by weight per 100 parts by weight of the diene rubber. The compounded amount of zinc oxide is preferably from 0.05 to 10 parts by weight and more preferably from 0.5 to 3 parts by weight per 100 parts by weight of the diene rubber.

The plasticizer used as a compounding agent is not particularly limited, but an aroma-based, naphthene-based, paraffin-based, or silicone-based extender oil is selected in accordance with the application. The amount of the plasticizer used is ordinarily from 1 to 150 parts by weight, preferably from 2 to 100 parts by weight, and even more preferably from 3 to 60 parts by weight per 100 parts by weight of the diene rubber. When the amount of the plasticizer used is within this range, the reinforcing agent dispersing effect, tensile strength, wear resistance, heat resistance, and the like are balanced to a high degree. Other examples of plasticizers include diethylene glycol, polyethylene glycol, and silicone oils.

The thermosetting resin is not particularly limited, but examples thereof include resorcin-formaldehyde resins, phenol-formaldehyde resins, urea-formaldehyde resins, melamine-formaldehyde resins, and phenol derivative-formaldehyde resins, and more specifically thermosetting resins which are cured or polymerized by heating or applying heat and a methylene donor such as m-3,5-xylenol-formaldehyde resins and 5-methylresorcin-formaldehyde resins, as well as other resins such as guanamine resins, diallylphthalate resins, vinyl ester resins, phenol resins, unsaturated polyester resins, furan resins, polyimide resins, polyurethane resins, melamine resins, urea resins, and epoxy resins.

The thermoplastic resin is not particularly limited, but examples thereof include general-purpose resins such as polystyrene resins, polyethylene resins, polypropylene resins, polyester resins, polyamide resins, polycarbonate resins, polyurethane resins, polysulfone resins, polyphenylene ether resins, and polyphenylene sulfide resins. Other examples include aromatic hydrocarbon resins such as styrene-α-methylstyrene resins, indene-isopropenyltoluene resins, and coumarone-indene resins, dicyclopentadiene resins, hydrocarbon resins such as petroleum resins containing 1,3-pentadiene, pentene, methylbutene, or the like as a main raw material, alkylphenol resins, modified phenol resins, terpenephenol resins, terpene resins, and aromatic modified terpene resins.

Since the rubber composition of the present technology exhibits wear resistance, tensile strength at break, and tensile elongation at break which are enhanced to or beyond conventional levels, the steering stability and wear resistance of a pneumatic tire can be enhanced to or beyond conventional levels.

The rubber composition of the present technology can be suitably used for a cap tread portion, an undertread portion, a sidewall portion, and a bead filler portion of a pneumatic tire, a coating rubber for a cord such as a carcass layer, a belt layer, or a belt cover layer, a side reinforcing rubber layer with a crescent-shaped cross section in a run-flat tire, a rim cushion portion, or the like. A pneumatic tire in which the rubber composition of the present technology is used for these members makes it possible to maintain and enhance steering stability, wear resistance, and durability to or beyond conventional levels due to the enhancement of wear resistance, tensile strength at break, and tensile elongation at break.

The present technology is further explained below by examples. However, the scope of the present technology is not limited to these examples.

EXAMPLES

Fourteen types of styrene-butadiene copolymer components in which styrene-butadiene copolymers were blended alone or at the compounding ratios shown in Tables 1 and 2, were prepared and the following were measured: (1) the content of bonded styrene; (2) the ratio of the total amount of styrene of an ozone decomposed component S1 including one styrene-derived unit and an ozone decomposed component S1V1 including one styrene-derived unit and one 1,2-bonded butadiene-derived unit to the amount of bonded styrene (S1+S1V1; wt. %) and the ratio of the total amount of styrene of the ozone decomposed component S1V1 including one styrene-derived unit and one 1,2-bonded butadiene-derived unit to the amount of bonded styrene (S1V1; wt. %); (3) the ratio of the integrated intensity of a decomposed component S1V2 including one styrene-derived unit and two 1,2-bonded butadiene-derived units to the integrated intensity of all decomposed components including styrene-derived units (S1V2; %); and (4) the vinyl content of the butadiene portion. In addition, since NS460, NS522, HP755B, E581, NS570, and Nipol 1739 are oil extended products, the net compounded amounts of the rubber components are included in parentheses together with the actual compounded amounts.

The (1) content of bonded styrene and (4) vinyl content of the butadiene portion of the styrene-butadiene copolymer components were measured by $^1$H-NMR.

The conditions for the ozone decomposition of the styrene-butadiene copolymer components were as described above. In addition, (2) the ratio of the total amount of styrene of the ozone decomposed component S1 including one styrene-derived unit and the ozone decomposed component S1V1 including one styrene-derived unit and one 1,2-bonded butadiene-derived unit to the amount of bonded styrene (S1+S1V1; wt. %) and the ratio of the total amount of styrene of the ozone decomposed component S1V1 including one styrene-derived unit and one 1,2-bonded butadiene-derived unit to the amount of bonded styrene (S1V1; wt. %) were measured by gel permeation chromatography (GPC). The measurement conditions for gel permeation chromatography (GPC) were as described above. Further, (3) the ratio of the integrated intensity of the ozone decomposed component S1V2 (S1V2; %) including one styrene-derived unit and two 1,2-bonded butadiene-derived units to the integrated intensity of all decomposed components including styrene-derived units was measured by liquid chromatography-mass spectrometer (LCMS). The measurement conditions for liquid chromatography-mass spectrometer (LCMS) were as described above.

The fourteen types of rubber compositions containing the compounding agents shown in Table 3 as common components to be compounded, the styrene-butadiene copolymer components shown in Tables 1 and 2 (single styrene-butadiene copolymer or blend of a plurality of styrene-butadiene copolymers), and the other diene rubber compositions (Examples 1 to 9 and Comparative Examples 1 to 5) were mixed for 6 minutes with the components excluding sulfur and the vulcanization accelerator using a 1.7-L sealed Banbury mixer, and after the mixture was discharged from the mixer at 150° C., the mixture was cooled to room temperature. Next, the mixture was mixed again for 3 minutes using the 1.7-L sealed Banbury mixer and discharged. The sulfur and the vulcanization accelerators were then mixed in using an open roll to obtain a rubber composition. The obtained rubber composition was vulcanized for 30 minutes at 160° C. in a predetermined mold to form a vulcanized rubber test piece. The obtained vulcanized rubber test piece was used to evaluate the wear resistance, tensile strength at break, and tensile elongation at break with the following measurement methods.

Tensile Strength at Break and Tensile Elongation at Break

Using the obtained vulcanized rubber test piece, a dumbbell JIS (Japanese Industrial Standard) No. 3 shaped test piece was fabricated in accordance with JIS K6251. A tensile test was performed at a tensile test speed of 500 mm/min at room temperature (20° C.), and the tensile strength at break and the tensile elongation at break at the time of break were measured. The obtained results are shown in the "Tensile strength at break" and "Tensile elongation at break" rows of Tables 1 and 2 with the index values of Comparative Example 1 each being 100. Greater index values of the tensile strength at break mean greater tensile strength at break and superior breakdown resistance when the composition is made into a pneumatic tire. Greater index values of the tensile elongation at break mean greater tensile elongation at break and superior durability when the composition is made into a pneumatic tire.

Wear Resistance

Using the obtained vulcanized rubber test piece, the amount of wear was measured in accordance with JIS K6264 using a Lambourn abrasion test machine (manufactured by Iwamoto Seisakusho Co. Ltd.) under the following conditions: load=15.0 kg (147.1 N), slip rate=25%. Each of the reciprocal values of the obtained results were calculated and are shown in the rows of "Wear resistance" in Tables 1 and 2 as index values using the reciprocal of the amount of wear of Comparative Example 1 as an index value of 100. Greater index values of wear resistance indicate superior wear resistance.

TABLE 1

|  |  | Comparative Example 1 | Comparative Example 2 | Comparative Example 3 | Comparative Example 4 | Comparative Example 5 |
|---|---|---|---|---|---|---|
| HPR840 | part by weight |  | 50 |  |  |  |
| NS116 | part by weight | 100 |  |  |  |  |
| NS616 | part by weight |  |  |  | 100 |  |

TABLE 1-continued

| | | Comparative Example 1 | Comparative Example 2 | Comparative Example 3 | Comparative Example 4 | Comparative Example 5 |
|---|---|---|---|---|---|---|
| NS460 | part by weight | | | | | 68.5 (50) |
| HPR850 | part by weight | | 50 | | | |
| NS522 | part by weight | | | 110 (80) | | |
| Nipol 1739 | part by weight | | | | | 68.5 (50) |
| BR | part by weight | | | 20 | | |
| Oil | part by weight | 37.5 | 37.5 | 7.5 | 37.5 | 0 |
| Bonded styrene content | wt. % | 20.9 | 18.9 | 39.2 | 20.9 | 32.4 |
| Vinyl content | % | 63.8 | 50.1 | 42.2 | 63.3 | 40.6 |
| S1 + S1V1 | wt. % | 65.2 | 49.5 | 59.2 | 66.2 | 46.2 |
| S1V1 | wt. % | 24.7 | 13.9 | 9.0 | 19.0 | 7.3 |
| S1V2 (integrated intensity ratio) | % | 27.8 | 16.3 | 16.0 | 14.1 | 15.1 |
| Wear resistance | Index value | 100 | 105 | 95 | 100 | 91 |
| Tensile elongation at break | Index value | 100 | 98 | 106 | 98 | 113 |
| Tensile strength at break | Index value | 100 | 95 | 110 | 98 | 120 |

TABLE 2

| | | Example 1 | Example 2 | Example 3 | Example 4 | Example 5 | Example 6 | Example 7 | Example 8 | Example 9 |
|---|---|---|---|---|---|---|---|---|---|---|
| YO31 | part by weight | | 54 | 70 | | | | 48 | 36 | 85 |
| HPR840 | part by weight | | | | | | | 32 | 24 | |
| NS460 | part by weight | | 49.5 (36) | | | | | | | |
| 5260H | part by weight | 100 | | | 70 | 80 | 85 | | 40 | |
| 5220M | part by weight | | | | | | 15 | | | |
| HP755B | part by weight | | | 41.25 (30) | | | | | | |
| E581 | part by weight | | | | 41.25 (30) | | | | | |
| NS570 | part by weight | | | | | 25 (20) | | | | |
| Nipol 1739 | part by weight | | | | | | | | | 20.63 (15) |
| NR | part by weight | | | | | | | 20 | | |
| BR | part by weight | | 10 | | | | | | | |
| Oil | part by weight | 37.5 | 24 | 26.25 | 26.25 | 32.5 | 37.5 | 37.5 | 37.5 | 31.87 |
| Bonded styrene content | wt. % | 27.9 | 26.3 | 30.8 | 30.4 | 30.5 | 27.7 | 20.6 | 23.7 | 29.0 |
| Vinyl content | % | 55.0 | 59.6 | 52.1 | 51.2 | 50.4 | 50.7 | 51.1 | 55.8 | 51.6 |
| S1 + S1V1 | wt. % | 40.8 | 52.5 | 60.8 | 38.7 | 46.2 | 43.0 | 47.6 | 42.5 | 54.3 |
| S1V1 | wt. % | 6.9 | 8.4 | 7.4 | 7.5 | 7.2 | 8.2 | 6.4 | 9.4 | 5.0 |
| S1V2 (integrated intensity ratio) | % | 8.6 | 14.5 | 14.9 | 12.8 | 12.6 | 12.7 | 11.1 | 12.5 | 12.4 |

TABLE 2-continued

|  |  | Example 1 | Example 2 | Example 3 | Example 4 | Example 5 | Example 6 | Example 7 | Example 8 | Example 9 |
|---|---|---|---|---|---|---|---|---|---|---|
| Wear resistance | Index value | 106 | 110 | 102 | 103 | 103 | 106 | 103 | 105 | 103 |
| Tensile elongation at break | Index value | 103 | 112 | 106 | 105 | 104 | 103 | 106 | 103 | 109 |
| Tensile strength at break | Index value | 125 | 120 | 131 | 133 | 129 | 123 | 120 | 121 | 134 |

The types of raw materials used in Tables 1 and 2 are described below.

YO31: Asaprene YO31 manufactured by Asahi Kasei Chemicals Corporation, bonded styrene content: 27.1 wt. %, vinyl content: 57.5%, non-oil extended product HPR840: HPR840 manufactured by JSR Corporation, bonded styrene content: 5.6 wt. %, vinyl content: 21.2%, non-oil extended product NS116: NS116 manufactured by Zeon Corporation, bonded styrene content: 20.9 wt. %, vinyl content: 63.8%, non-oil extended product NS616: NS616 manufactured by Zeon Corporation, bonded styrene content: 20.9 wt. %, vinyl content: 63.3%, non-oil extended product NS460: NS460 manufactured by Zeon Corporation, bonded styrene content: 25.1 wt. %, vinyl content: 62.8%, oil extended product prepared by adding 37.5 parts by weight of an oil component to 100 parts by weight of SBR HPR850: HPR850 manufactured by JSR Corporation, bonded styrene content: 27.0 wt. %, vinyl content: 58.8%, non-oil extended product 5260H: 5260H manufactured by Korea Kumho Petrochemical Co., Ltd., bonded styrene content: 27.9 wt. %, vinyl content: 55.0%, non-oil extended product NS522: NS522 manufactured by Zeon Corporation, bonded styrene content: 39.2 wt. %, vinyl content: 42.2%, oil extended product prepared by adding 37.5 parts by weight of an oil component to 100 parts by weight of SBR 5220M: 5220M manufactured by Korea Kumho Petrochemical Co., Ltd., bonded styrene content: 26.3 wt. %, vinyl content: 26.5%, non-oil extended product HP755B: HP755B manufactured by JSR corporation, bonded styrene content: 39.6 wt. %, vinyl content: 39.4%, oil extended product prepared by adding 37.5 parts by weight of an oil component to 100 parts by weight of SBR E581: E581 manufactured by Asahi Kasei Chemicals Corporation, bonded styrene content: 35.6 wt. %, vinyl content: 41.3%, oil extended product prepared by adding 37.5 parts by weight of an oil component to 100 parts by weight of SBR NS570: NS570 manufactured by Zeon Corporation, bonded styrene content: 40.6 wt. %, vinyl content: 19.0%, oil extended product prepared by adding 25 parts by weight of an oil component to 100 parts by weight of SBR Nipol 1739: manufactured by Zeon Corporation, bonded styrene content: 39.8 wt. %, vinyl content: 18.4%, oil extended product prepared by adding 37.5 parts by weight of an oil component to 100 parts by weight of SBR NR: Natural rubber, TSR20

BR: Polybutadiene rubber; Nipol BR1220, manufactured by Zeon Corporation

Oil: Extract No. 4S, manufactured by Showa Shell Sekiyu K.K.

TABLE 3

| Common formulation of rubber composition | |
|---|---|
| Silica | 70.0 part by weight |
| Silane coupling agent | 5.6 part by weight |
| Carbon black | 5.0 part by weight |
| Zinc oxide | 3.0 part by weight |
| Stearic acid | 2.0 part by weight |
| Anti-aging agent | 1.5 part by weight |
| Wax | 1.0 part by weight |
| Sulfur | 1.5 part by weight |
| Vulcanization accelerator 1 | 1.7 part by weight |
| Vulcanization accelerator 2 | 2.0 part by weight |

The types of raw materials used as per Table 3 are described below.

Silica: Nipsil AQ manufactured by Nippon Silica Co., Ltd.

Silane coupling agent: sulfide-based silane coupling agent, Si69VP manufactured by Degussa Carbon black: Shoblack N339M manufactured by Showa Cabot K.K.

Zinc oxide: Zinc Oxide #3 manufactured by Seido Chemical Industry Co., Ltd.

Stearic acid: stearic acid manufactured by NOF Corporation

Anti-aging agent: Santoflex 6PPD manufactured by Solutia Europe

Wax: paraffin wax manufactured by Ouchi Shinko Chemical Industrial Co., Ltd.

Sulfur: oil-treated sulfur manufactured by Karuizawa Refinery Ltd.

Vulcanization accelerator 1: Sanceller CM-PO(CZ) manufactured by Sanshin Chemical Industry Co., Ltd.

Vulcanization accelerator 2: Sanceller D-G (DPG) manufactured by Sanshin Chemical Industry Co., Ltd.

As is clear from Tables 1 and 2, it was confirmed that the rubber compositions of Examples 1 to 9 were enhanced so as to exhibit wear resistance, tensile strength at break, and tensile elongation at break.

In the styrene-butadiene copolymer component of the rubber composition of Comparative Example 2, the ratio of the total amount of styrene of the ozone decomposed product including one styrene-derived unit and one 1,2-bonded butadiene-derived unit to the amount of bonded styrene (S1V1) is not less than 10 wt. %, and the ratio of the integrated intensity of the ozone decomposed product including one styrene-derived unit and two 1,2-bonded butadiene-derived units (S1V2) is not less than 15%, so the tensile strength at break and the tensile elongation at break are inferior.

In the styrene-butadiene copolymer components of the rubber compositions of Comparative Examples 3 and 5, the vinyl content is less than 50%, and the ratio of the integrated intensity of the ozone decomposed product including one styrene-derived unit and two 1,2-bonded butadiene-derived units (S1V2) is not less than 15%, so the wear resistance is inferior.

In the styrene-butadiene copolymer component of the rubber composition of Comparative Example 4, the ratio of the total amount of styrene of the ozone decomposed product including one styrene-derived unit and one 1,2-bonded butadiene-derived unit to the amount of bonded styrene (S1V1) is not less than 10 wt. %, so the tensile strength at break and the tensile elongation at break are inferior.

The invention claimed is:

1. A rubber composition comprising a diene rubber containing at least one type of styrene-butadiene copolymer and a reinforcing filler, a styrene-butadiene copolymer component, including the at least one type of styrene-butadiene copolymer, and having the characteristics of (1) to (4):

(1) a bonded styrene content is from 5 to 50 wt. %;
   (2) when a decomposed component S1 including one styrene-derived unit and a decomposed component S1V1 including one styrene-derived unit and one 1,2-bonded butadiene-derived unit are measured by gel permeation chromatography as decomposed components obtained by ozone decomposition, a total amount of styrene of the decomposed component S1 and the decomposed component S1V1 is less than 80 wt. % of the amount of bonded styrene, and a total amount of styrene of the decomposed component S1V1 is less than 10 wt. % of the amount of bonded styrene;
   (3) when the decomposed components obtained by ozone decomposition are measured by liquid chromatography-mass spectrometer, an integrated intensity of a decomposed component S1V2 including one styrene-derived unit and two 1,2-bonded butadiene-derived units is less than 15% of an integrated intensity of all decomposed components including styrene-derived units; and
   (4) a vinyl content of a butadiene portion is not less than 50% and not more than 59.6%.

2. The rubber composition according to claim 1, wherein the diene rubber further contains at least one type selected from natural rubber, polyisoprene, and polybutadiene.

3. The rubber composition according to claim 2, wherein the reinforcing filler is at least one type selected from silica and carbon black.

4. The rubber composition according to claim 1, wherein the reinforcing filler is at least one type selected from silica and carbon black.

5. A pneumatic tire using the rubber composition according to claim 1.

6. The pneumatic tire according to claim 5, wherein the rubber composition is used in a cap tread.

7. A pneumatic tire using the rubber composition according to claim 3.

8. The pneumatic tire according to claim 7, wherein the rubber composition is used in a cap tread.

* * * * *